United States Patent Office 3,626,716
Patented Dec. 14, 1971

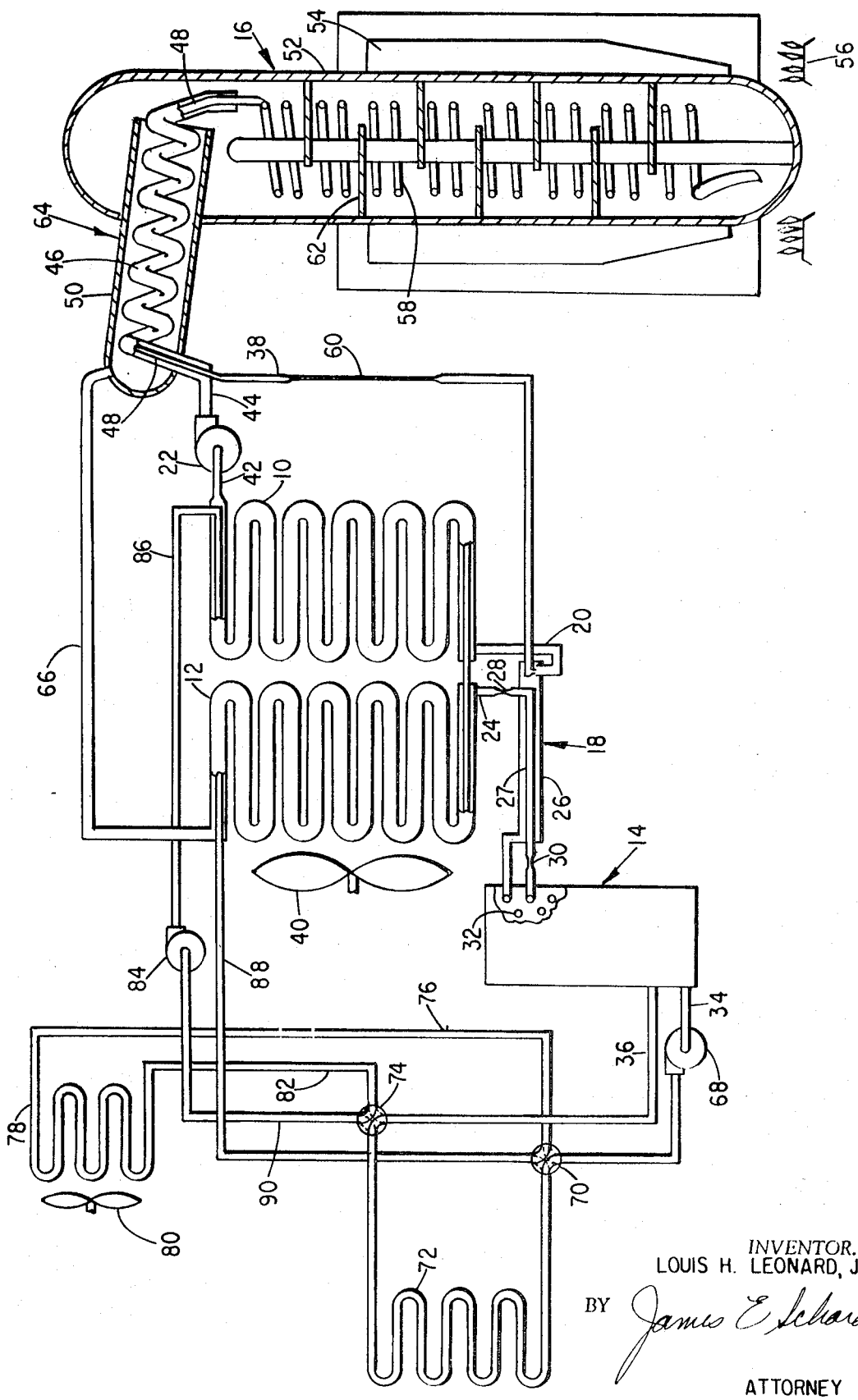

3,626,716
ABSORPTION REFRIGERATION MACHINE HEAT PUMP
Louis H. Leonard, Jr., Dewitt, N.Y., assignor to Carrier Corporation, Syracuse, N.Y.
Filed Oct. 15, 1969, Ser. No. 866,699
Int. Cl. F25b 13/00, 15/04
U.S. Cl. 62—324                3 Claims

ABSTRACT OF THE DISCLOSURE

An absorption refrigeration machine employing an absorber and a condenser adapted for passage of ambient air thereover for cooling the condenser and absorber when the machine is operating on the cooling mode and for passage of a liquid heat exchange medium through the absorber and condenser for cooling thereof when the machine is operating on the heating mode.

BACKGROUND OF THE INVENTION

The use of heat pumps which are capable of cooling a conditioned space in the summer and heating the conditioned space in the winter has become increasingly popular due to the utilization of a single machine for accomplishing both purposes as contrasted to an air conditioner for cooling and a separate furnace to provide heating. An absorption refrigeration machine is ideally suited for heat pump operation due to the large quantities of heat utilized to operate the machine. However, suggested modifications of absorption machines to convert them for heat pump operation have heretofore resulted in heating-cooling absorption refrigeration machines having a prohibitive cost.

SUMMARY OF THE INVENTION

The present invention relates to an absorption refrigeration machine employing heat exchangers in the absorption cycle utilizing ambient air as a heat exchange medium when the machine is operating on the cooling mode. Tubes disposed within the heat exchangers are provided for circulation of a liquid heat exchange medium therethrough when the machine is operating on the heating mode. Reversing valves in the liquid heat exchange medium circuit are provided for passing hot liquid heat exchange medium from the absorption machine to a heat exchanger within the conditioned space to provide heating thereof and for passing chilled liquid heat exchange medium from the absorption machine to the heat exchanger within the conditioned space to provide cooling. A secondary heat exchanger is provided to utilize ambient air to heat chilled heat exchange medium when the machine is operating on the heating mode.

BRIEF DESCRIPTION OF THE DRAWING

The figure is a schematic drawing of an absorption refrigeration machine heat pump.

DESCRIPTION OF THE PREFERRED EMBODIMENT

Referring to the drawing, there is shown a refrigeration system comprising an absorber 10, a condenser 12, an evaporator or chiller 14, a generator 16, and a liquid-suction heat exchanger connected to provide refrigeration. A pump 22 is employed to circulate weak absorbent solution from absorber 10 to generator 16.

As used herein, the term "weak absorbent solution" refers to solution which is weak in absorbent power, and the term "strong absorbent solution" refers to solution which is strong in absorbent power. A suitable absorbent for use in the system described is water; a suitable refrigerant is ammonia.

Liquid refrigerant condensed in condenser 12 passes through refrigerant liquid passage 24 to the liquid-suction heat exchanger 18. The liquid-suction heat exchanger includes a housing 26 having a refrigerant line 27 therein. Line 27 has a refrigerant restrictor 28 at the upstream end and a refrigerant restrictor 30 at the downstream end thereof. A portion of the liquid refrigerant supplied to the liquid-suction heat exchanger 18 flashes upon passing through restrictor 28 due to the low pressure existing downstream of the restrictor, thereby cooling the remainder of the refrigerant in the refrigerant line 27. The cooled refrigerant liquid and flashed refrigerant vapor then pass through restrictor 30 into heat exchanger 32 of chiller 14.

A heat exchange medium such as water or a solution of water and inhibited ethylene glycol is passed over the exterior of heat exchanger 32 where it is chilled by giving up heat to evaporate the refrigerant within the heat exchanger. The chilled heat exchange medium passes out of chiller 14 through line 34 to suitable remote heat exchangers and is returned to the chiller through inlet 36 for rechilling.

The cold refrigerant evaporated in heat exchanger 32, along with a small quantity of absorbent which is carried over to the chiller with the refrigerant from the generator, passes through the liquid-suction heat exchanger housing 26 in heat exchange relation with the refrigerant passing through refrigerant line 27. By passing the vapor and liquid in housing 26 in heat transfer relationship with the liquid refrigerant in line 27, a large quantity of refrigerant in the absorbent liquid in housing 26 is vaporized. The heat of vaporization is therefore removed from the liquid in line 27, thereby reducing the temperature of the liquid refrigerant supplied to heat exchanger 32. This heat transfer within the liquid-suction heat exchanger 18 provides an increase in the absorption machine efficiency by transferring heat from the condensed refrigerant to the refrigerant vapor and absorbent liquid discharged from the chiller.

Strong solution which is supplied from the generator to the liquid-suction heat exchanger through line 38 is discharged into refrigerant distributor line 20 where it mixes with the vapor and solution from housing 26 which is induced into line 20 by the discharge of strong solution therein.

The refrigerant vapor-absorbent solution mixture from distributor line 20 is supplied to absorber 10. Suitable fan means 40 are provided for passing ambient air over the surface of the absorber in heat exchange relation with the solution therein for cooling the absorbent solution to promote the absorption of the refrigerant vapor by the solution when the machine is being utilized to satisfy a cooling load. A liquid heat exchange medium is circulated through the absorber for cooling the absorbent solution when the machine is being utilized to satisfy a heating load. The same cooling medium may be supplied to condenser 12 in heat exchange relation with refrigerant vapor therein to condense the refrigerant.

Cold weak absorbent solution passes from absorber 10 through line 42 into pump 22. Liquid from pump 22 is passed through line 44 to rectifier heat exchange coil 46. The weak solution passes through coil 46 in heat exchange relation with hot strong solution passing through heat exchange coil 48 disposed within coil 46 and with the hot refrigerant vapor flowing through rectifier shell 50 in contact with the outer surface of coil 46. The weak solution from coil 46 is discharged into the upper portion of generator 16 along with any vapor which is formed in coil 46 due to heat exchange with the hot vapor passing thereover and the hot solution flowing therethrough.

Generator 16 comprises a shell 52 having tapered fins 54 suitably affixed thereto as by welding. Suitable heating means, including gas burner 56 are provided for heating the generator. The weak solution is boiled in generator 16 to concentrate the solution, thereby forming a strong solution and refrigerant vapor.

The hot strong absorbent solution passes upwardly through the analyzer section of generator 16 through analyzer coil 58 in heat exchange with the weak solution passing downwardly over the coil. The warm strong solution then passes through heat exchange coil 48 within coil 46 and line 38 into the distributor 20. A restrictor 60 is provided in line 38 so that the solution supplied to the vapor distributor line 20 is at the same pressure as the vapor in housing 26.

Refrigerant vapor formed in generator 16 passes upwardly through the analyzer section thereof where it is concentrated by mass heat transfer with weak solution passing downwardly over analyzer coil 58. Analyzer plates 62 in generator 16 provide a tortuous path for flow of solution and vapor to assure intimate contact therebetween to improve the mass heat transfer. The vapor then passes through rectifier 64 in heat exchange relation with the weak solution passing through coil 46. Absorbent condensed in rectifier 64 flows downwardly into the generator along with the weak solution discharged from coil 46. Refrigerant vapor passes from rectifier 64 through line 66 to condenser 12 to complete the refrigeration cycle.

When the machine is being utilized to satisfy a cooling load, chilled heat exchange medium such as water from chiller 14 is circulated by a pump 68 through a reversing valve 70 to a heat exchange coil 72 which is disposed within the conditioned space. A suitable heat exchange medium such as air is passed over heat exchange coil 72 and circulated throughout the conditioned space for cooling thereof. The heat exchange medium from heat exchange coil 72 is passed through reversing valve 74 and return line 36 to chiller 14.

When it is necessary to satisfy a heating load within the conditioned space, valves 70 and 74 are reversed by suitable means such as solenoids (not shown) to direct chilled heat exchange medium from pump 68 through valve 70 and line 76 to a secondary heat exchanger 78 which is disposed exteriorly of the conditioned space. Suitable fan means 80 are provided for passing ambient air over heat exchanger 78 in heat exchange relation with the heat exchange medium flowing therethrough to extract heat from the ambient air. The heat exchange medium from heat exchanger 78 is returned to chiller 14 through line 82, valve 74, and line 36. In order to provide hot heat exchange medium to coil 72, a pump 84 is energized to pump heat exchange medium through line 86 which is disposed within the absorber and condenser tubes. The heat exchange medium passes through the absorber and condenser in heat exchange relationship with the refrigerant-absorbent solution in the absorber, and the refrigerant in the condenser for promoting absorption of refrigerant by the absorbent solution in the absorber and for condensing refrigerant in the condenser. The hot heat exchange medium from the condenser passes through line 88 and valve 70 to heat exchange coil 72 for heating the air passing thereover. The cooled heat exchange medium passes from heat exchange coil 72 through valve 74 and line 90 to pump 84 to complete the circuit. It should be understood that fan means 80 and pump 84 are deenergized when the machine is satisfying a cooling load, and fan means 40 are deenergized when the machine is satisfying a heating load.

By providing an absorber and condenser which are cooled by direct heat transfer with ambient air when the machine is satisfying a cooling load, higher machine efficiencies may be obtained than would be possible in a system employing liquid heat exchange medium to cool the absorber and condenser and then cooling the heat exchange medium in a secondary heat exchanger by passing ambient air thereover.

The cumulative inefficiencies of an air-liquid heat exchanger and a liquid heat exchange medium-absorber heat exchanger would result in higher absorber temperatures than can be obtained by direct heat exchange between ambient air and the absorber.

It can be seen from the foregoing that the basic absorption cycle is not altered or in any way disturbed to produce heating or cooling in the area being conditioned. The only valves employed in the system are in the low pressure heat exchange medium circuit which supplies either chilled or heated heat exchange medium to heat exchanger 72. Since this is ordinarily water or an inhibited ethylene glycol-water solution which is compatible with a number of materials, corrosion of the reversing valves is minimized. Further, if a valve should fail and develop a leak, replacement of the heat exchange medium will be relatively inexpensive. Any problem with the heat exchange medium circuit will be of a relatively minor nature since it will not involve the basic absorption refrigeration cycle.

I claim:

1. An absorption refrigeration machine having a generator, a condenser, an absorber, and an evaporator connected to provide refrigeration, said condenser including:
   first tubular means adapted for passing a liquid heat exchange medium therethrough, and second tubular means adapted to enclose said first tubular means for passing refrigerant over the exterior of said first tubular means, said absorber including;
   third tubular means adapted for passing a liquid heat exchange medium therethrough, and fourth tubular means adapted to enclose said third tubular means for passing absorbent solution and refrigerant vapor over the exterior of said third tubular means;
   a first heat exchange coil for satisfying a heating or a cooling load;
   first pump means for passing liquid heat exchange medium through said first and third tubular means in heat exchange relation with the refrigerant in said second tubular means and the absorbent solution and refrigerant in said fourth tubular means and supplying the heated liquid heat exchange medium therefrom to said heat exchange coil to satisfy a heating load;
   second pump means for passing liquid heat exchange medium in heat exchange relation with said evaporator to vaporize refrigerant therein, thereby cooling the liquid heat exchange medium and supplying the cooled liquid heat exchange medium to said heat exchange coil to satisfy a cooling load; and
   fan means for passing ambient air over the exterior of said second and fourth tubular means in heat exchange relation with refrigerant vapor in said second tubular means for condensing the refrigerant therein and with the refrigerant and absorbent solution in said fourth tubular means for absorbing heat therefrom when cooled liquid heat exchange medium is being supplied to said heat exchange coil.

2. An absorption refrigeration machine according to claim 1 further including:
   a second heat exchange coil, liquid heat exchange medium being passed in heat exchange relationship with said evaporator and said second heat exchange coil when said machine is satisfying a heating load; and
   means for passing ambient air over said second heat exchange coil in heat exchange relation with the liquid heat exchange medium therein for absorbing heat from the ambient air and utilizing the heat absorbed to vaporize refrigerant in said evaporator.

3. An absorption refrigeration machine according to claim 2 further including:
  lines communicating between said evaporator, said first heat exchange coil, said second heat exchange coil, said first tubular means and said third tubular means; and
  reversing valves connecting the lines associated with said first and third tubular means and said lines associated with said evaporator to communicate said evaporator with said second heat exchange coil when said first and third tubular means are in communication with said first heat exchange coil to satisfy a heating load and to communicate said evaporator with said first heat exchange coil when the machine is satisfying a cooling load.

References Cited

UNITED STATES PATENTS

| | | | |
|---|---|---|---|
| 2,152,250 | 3/1939 | Gay | 165—62 X |
| 2,212,869 | 8/1940 | Tornquist | 62—324 X |
| 2,401,890 | 6/1946 | Smith et al. | 62—325 |
| 3,369,373 | 2/1968 | Merrick | 62—476 X |
| 3,527,060 | 9/1970 | Kruggel | 62—476 X |

MEYER PERLIN, Primary Examiner

P. D. FERGUSON, Assistant Examiner

U.S. Cl. X.R.

62—476, 485; 165—62